(12) United States Patent
Tomita et al.

(10) Patent No.: US 8,904,288 B2
(45) Date of Patent: Dec. 2, 2014

(54) IMAGE FORMING DEVICE, USER-INTERFACE IMAGE CREATING METHOD, AND COMPUTER-READABLE RECORDING MEDIUM

(75) Inventors: Kouichi Tomita, Osaka (JP); Norihisa Takayama, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1547 days.

(21) Appl. No.: 11/947,042

(22) Filed: Nov. 29, 2007

(65) Prior Publication Data

US 2008/0288879 A1 Nov. 20, 2008

(30) Foreign Application Priority Data

May 17, 2007 (JP) .................................. 2007-131369

(51) Int. Cl.
*G06F 3/00* (2006.01)
*H04N 1/00* (2006.01)
*G03G 15/00* (2006.01)

(52) U.S. Cl.
CPC . *H04N 1/00511* (2013.01); *G03G 2215/00109* (2013.01); *G03G 15/5075* (2013.01); *H04N 1/0035* (2013.01); *H04N 1/00973* (2013.01); *H04N 1/00278* (2013.01); *G03G 15/502* (2013.01)
USPC .......................................... 715/740; 718/102

(58) Field of Classification Search
CPC .............. G06K 7/10683; G06K 15/02; G06K 17/0022; B41J 2202/20
USPC ....................................................... 715/740
See application file for complete search history.

(56) References Cited

U.S. PATENT DOCUMENTS

| 6,092,088 | A | 7/2000 | Takeda |
| 7,120,910 | B2* | 10/2006 | Matsuda et al. ............... 718/102 |
| 2001/0009424 | A1* | 7/2001 | Sekiguchi ..................... 345/740 |

FOREIGN PATENT DOCUMENTS

| JP | 5-216314 | A | 8/1993 |
| JP | 7-306762 | A | 11/1995 |
| JP | 10-150521 | A | 6/1998 |
| JP | 2001-318563 | A | 11/2001 |
| JP | 2002-103748 | A | 4/2002 |
| JP | 2003-118177 | | 4/2003 |
| JP | 2006-005963 | A | 1/2006 |
| JP | 2006-139672 | | 6/2006 |
| JP | 2006-231554 | | 9/2006 |
| JP | 2006-260204 | | 9/2006 |

OTHER PUBLICATIONS

Notification of Reasons for Refusal in JP 2007-131369 dated May 19, 2009, and an English Translation thereof.

* cited by examiner

*Primary Examiner* — Nicholas Augustine
*Assistant Examiner* — Andres E Gutierrez
(74) *Attorney, Agent, or Firm* — Buchanan Ingersoll & Rooney PC

(57) ABSTRACT

An image forming apparatus is connectable to a PC and has an operation panel disposed on or in the vicinity of the image forming apparatus. When a request for acquisition of a user-interface image is received from the operation panel, the image forming apparatus creates, by using an instance, a user-interface image to be displayed on the operation panel. When a request for acquisition of a user-interface image is received from the PC, the image forming apparatus creates, by using another instance, a user-interface image to be displayed on the PC. The two instances belong to the same class.

9 Claims, 11 Drawing Sheets

FIG.6

| No | Id | Address |
|---|---|---|
| 1 | 000001 | 0x11111 |
| 2 | 000002 | 0x22222 |
| 3 | 000003 | 0x33333 |
| 4 | 000004 | 0x44444 |

FIG.7

| Id | X | Y |
|---|---|---|
| 000001 | 100 | 252 |

FIG.8

| Setting | Value |
|---|---|
| Job Type | Copy |
| Paper Size | A4 |
| Color | Full Color |
| ... | ... |

IMAGE FORMING DEVICE, USER-INTERFACE IMAGE CREATING METHOD, AND COMPUTER-READABLE RECORDING MEDIUM

This application is based on application No. 2007-131369 filed in Japan, the contents of which are hereby incorporated by reference.

BACKGROUND OF THE INVENTION (1) Field of the Invention

The present invention relates to an mage forming apparatus employed in MFPs (Multi Functional Peripherals) and other devices. More particularly, the present invention relates to a technique of remotely operating the image forming apparatus with a remote terminal connected to the image forming apparatus.

(2) Description of the Related Art

Generally, image forming apparatuses display a user-interface image on an operation panel that is disposed on or in the vicinity of the image forming apparatus (hereinafter, "local operation panel"). In addition, some image forming apparatuses are provided with a remote panel function of additionally displaying a user-interface image on a remote terminal connected to the image forming apparatus. With the remote panel function, the image forming apparatus allows a user to remotely control the image forming apparatus from his desk, by using a PC, for example. This saves the user from the trouble of moving to the image forming apparatus to make user operations.

The remote panel function known in the art allows a remote control of the image forming apparatus with a remote terminal, so that it is not necessary for the user to physically move to the installation site of the image forming apparatus. In principle, the operation panel and the remote terminal are controlled to operate in synchronism. More specifically, the local operation panel of the image forming apparatus and the remote terminal are controlled to hold the exactly same values. Thus, a user operation made on either of the local operation panel and the remote terminal affects both the user-interface images. Consequently, it is not possible that the local operation panel and the remote terminal receive different user operations without affecting the other. This limitation on the operatively does not matter much in the case where the remote panel function is used for maintenance work. However, in the case where the remote panel function is used for job execution, the remote panel function is used more frequently and problems associated with the above limitation are more notable.

SUMMARY OF THE INVENTION

In view of the above disadvantage, the present invention aims to provide an image forming apparatus having a function of receiving different user operations on a local operation panel of the image forming apparatus and on a remote terminal.

In order to achieve the above aim, the present invention provides an image forming apparatus connectable to a remote terminal. The image forming apparatus includes: a local operation panel; and an image creator that creates a first user-interface image to be displayed on the local operation panel and a second user-interface image to be displayed on the remote terminal, the first user-interface image being created by using a first instance upon receipt of an interface acquisition request from the local operation panel, the second user-interface image being created by using a second instance upon receipt of an interface acquisition request from the remote terminal, and the first and second instances belonging to a same class.

In another aspect, the present invention provides a user-interface image creating method that includes: an acquisition request receiving step of receiving a request for acquiring a user-interface image; and an image creating step of creating, if the request is received from a local operation panel disposed on an image forming apparatus, a first user-interface image to be displayed on the local operation panel by using a first instance, and creating, if the request is received from a remote terminal that is connected to the image forming apparatus, a second user-interface image to be displayed on the remote terminal by using a second instance that belongs to a same class as the first instance.

In yet another aspect, the present invention provides a computer-readable recording medium storing a program thereon. The program includes code that causes a computer to perform: an acquisition request receiving step of receiving a request for acquiring a user-interface image; and, an image creating step of creating, if the request is received from a local operation panel disposed on an image forming apparatus, a first user-interface image to be displayed on the local operation panel by using a first instance, and creating, if the request is received from a remote terminal that is connected to the image forming apparatus, a second user-interface image to be displayed on the remote terminal by using a second instance that belongs to a same class as the first instance.

With the above-stated configurations, the user-interface image to be displayed on the local operation panel is created by using the first instance, whereas the user-interface image to be displayed on the remote terminal is created by using the second instance. Since different instances are used, the image forming apparatus is enabled to display different user-interface images on the local operation panel and on the remote terminal. Thus, user operations from different users may be received in parallel. Since the present invention enables a plurality of user-interface images to be displayed on a plurality of remote terminals in addition to the local operation panel, user operations to the image forming apparatus are made with efficiency.

In addition, since the first and second instances belong to the same class, the same source-code module is allowed to commonly used for creating a user-interface image to be displayed on the local operation panel and for creating a user-interface image to be displayed on the remote terminal. The common use of the source-code modulation leads to reduction of the number of developing processes and the program size. In addition, since substantially the same user-interface image is provided on the local operation panel and on the remote terminal, users are allowed to operate the local operation panel and the remote terminal substantially in the same manner.

Each user-interface image may have at least a first state and a second state, and a predetermined region of the user-interface image in the first state is linked to the second state. If the received interface acquisition request includes coordinate information indicating a user-specified point on the user-interface image in the first state and if the user-specified point is located within the predetermined region, the image creator may create a corresponding one of the user-interface images in the second state as the user-interface image to be displayed.

With the above-stated configuration, the state of the user-interface image is specified by using the coordinate information.

The predetermined region may be associated with setting information for a job. The image creator may register the setting information for the job.

With the above-stated configuration, an appropriate piece of setting information according to the received user operation is applied to execution of a job.

The image forming apparatus may further include a scanner. The image creator may perform the creation, so that the second user-interface image includes a message indicating that use of the scanner is disabled and the first user-interface image does not include the message.

With the above-stated configuration, a warning that the scanner function is disabled is given to the user of the remote terminal.

The local operation panel may include a hardware button. The image creator may perform the creation, so that the second user-interface image includes a software button corresponding to the hardware button and the user-interface image does not include the software button.

With the above-stated configuration, the user of the remote terminal is provided with the same level of operability as the operability of the local operation panel.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 is a view showing exemplary information stored on a management table 154;

FIG. 7 is a view showing exemplary information included in a user-interface operation request;

FIG. 8 shows an example of setting information stored in an instance;

DESCRIPTION OF THE PREFERRED EMBODIMENT

The following describes the best mode for embodying the present invention with reference to the accompanying drawings.

<Structure>

Figure 1:
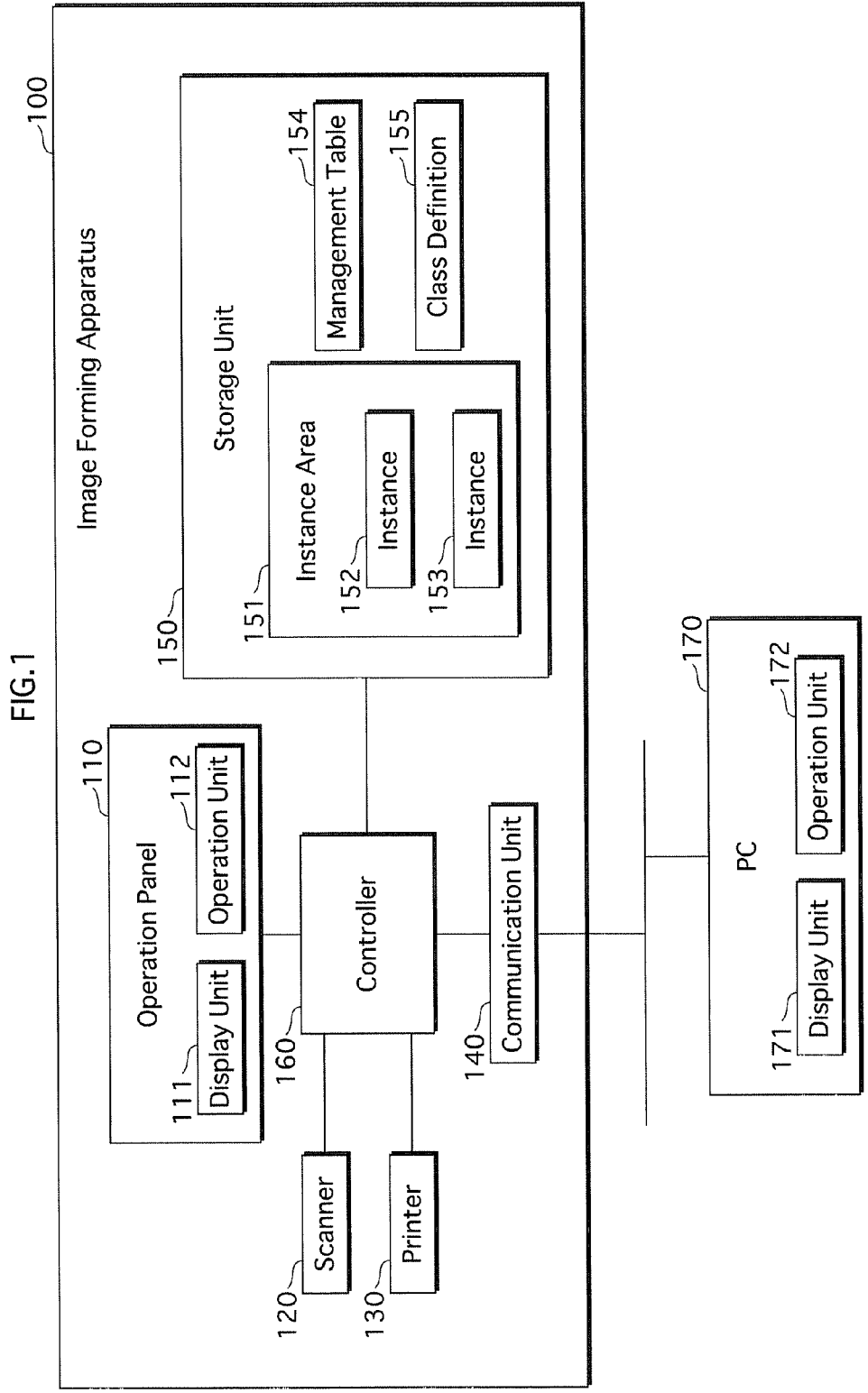
FIG. 1 is a view showing the structures of an image forming apparatus 100, a PC 170, and a system that includes the image forming apparatus 100 and the PC 170, all according to an embodiment of the present invention.

FIG. 1 is a view showing the structures of an image forming apparatus, a PC, and a system that includes the image forming apparatus and the PC all of which are according to an embodiment of the present invention.

More specifically, the system includes an image forming apparatus 100 and a PC 170. The image forming apparatus 100 includes an operation panel 110, a scanner 120, a printer 130, a communication unit 140, a storage unit 150, and a controller 160. The PC 170 is connected to the image forming apparatus 100 and acts as a remote terminal of the image forming apparatus 100.

Figure 2:
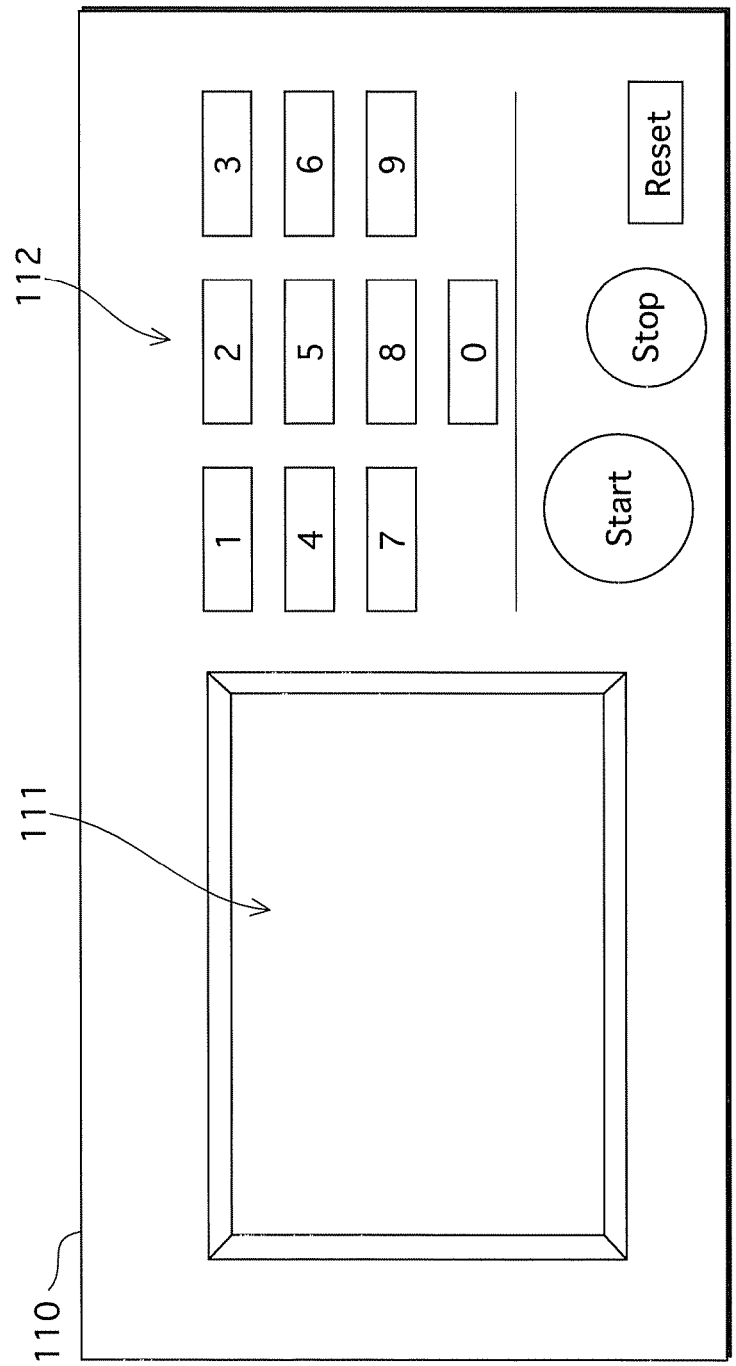
FIG. 2 is a view showing an exemplary display layout of the operation panel 110.

The operation panel 110 includes a display unit 111 and an operation unit 112. FIG. 2 is a view showing an exemplary display layout of the operation panel 110. The operation panel 110 includes a touch panel and hardware buttons. The touch panel acts as the display unit 111 and the operation unit 112, whereas the hardware buttons together act as the operation unit 112.

The scanner 120 reads an original document and convert it into image data. The printer 130 produces a printed output based on the image data. The communication unit 140 receives various information such as a user-interface display request from the PC 170.

Physically, the storage unit 150 is composed of ROM, RAM, and HDD. The storage unit 150 stores a management table 154 and a class definition 155. The class definition 155 corresponds to setting items, which are shown in the left column of a table shown in FIG. 8. In this embodiment, the class definition defines the items to be set in response to user operations made on the operation panel 110. The storage unit 150 has an instance area. An instance 152 and an instance 152 which belong to the same class are created in the instance area. The instance 152 corresponds to the operation panel 110, whereas the instance 152 corresponds to the PC 170. An instance is dynamically crated for each user-interface display request received on any of the clients (i.e., the operation panel 110 and the PC 170, in the present embodiment). In response to a display end request made on any of the clients, a corresponding instance is dynamically erased. The management table 154 associates an ID of an instance with a memory address of that instance (See FIG. 6).

The controller 160 controls the operation panel 110, the scanner 120, the printer 130, the communication unit 140, and the storage unit 150.

<Operation>

Figure 3:
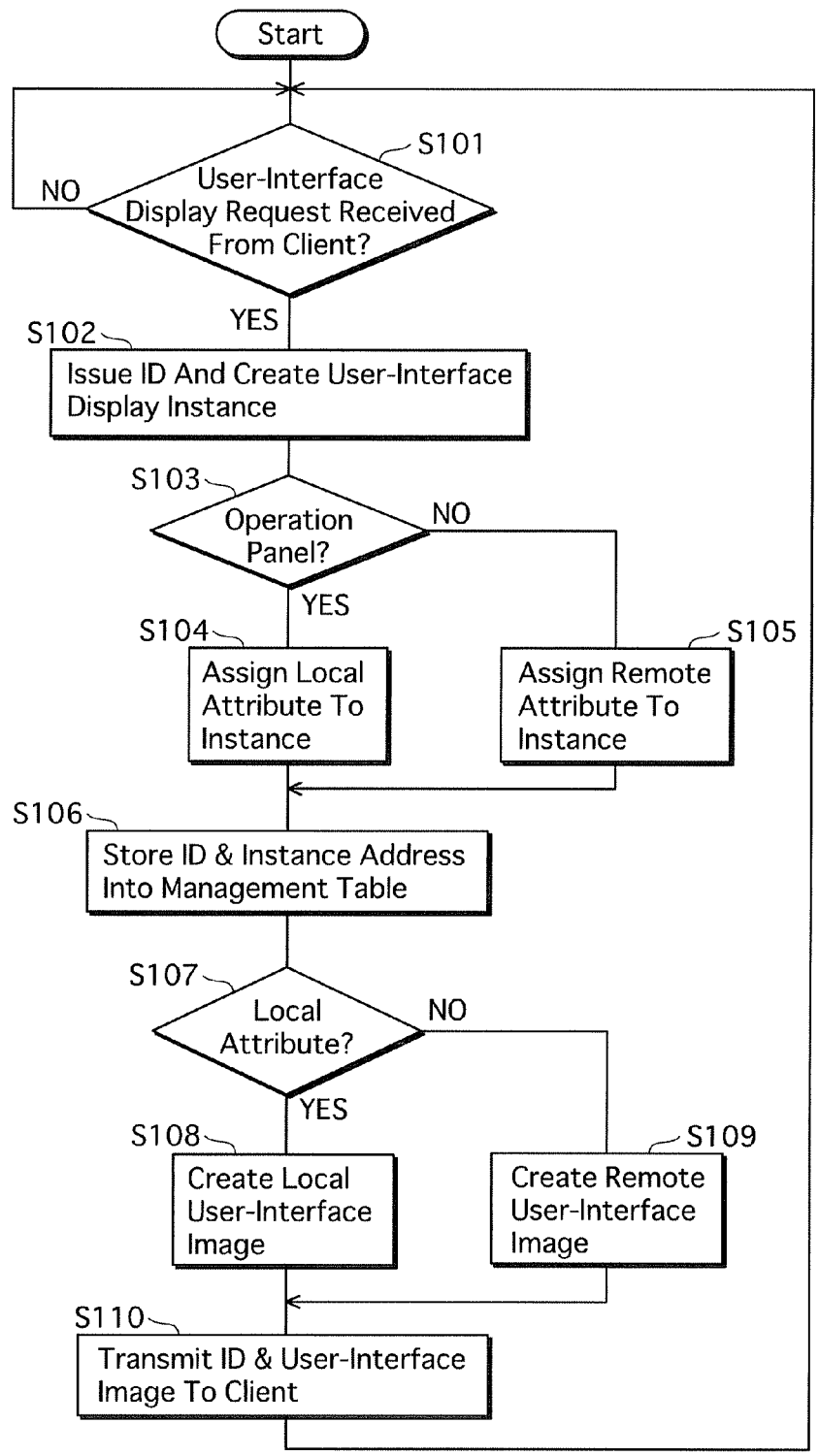
FIG. 3 is a flowchart of processing steps performed by the image forming apparatus 100, upon receipt of a user-interface display request.

FIG. 3 is a flowchart of processing steps performed by the image forming apparatus 100, upon receipt of a user-interface display request.

A client issues a user-interface display request to the image forming apparatus, in response to a predetermined event, such as switch-on or a user operation.

The image forming apparatus 100 is placed in the standby mode until a user-interface display request is received from a client (Step S101: NO). Upon receipt of a user-interface display request from a client while in the standby mode (Step S101: YES), the image forming apparatus 100 issues an ID and creates, in an instance area 151, an instance to be used for creating a user-interface image (Step S102).

If the client is the operation panel (Step S103: YES), the image forming apparatus 100 assigns a local attribute to the newly created instance. On the other hand, if the client is not the operation panel (Step S103: NO), the image forming apparatus 100 assigns a remote attribute to the newly created instance. Consequently, the instance 152 that is created correspondingly to a user operation made on the operation panel 110 is assigned with the local attribute, whereas the instance 153 that is created correspondingly to a user operation made on the PC 170 is assigned with the remote attribute. Each user-interface display request includes information used to judge whether or not the request is made on the operation panel. The image forming apparatus 100 makes the judgment based on that information.

The image forming apparatus 100 stores the ID issued for the newly created instance into the management table 154, together with the memory address of the instance (Step S106).

Figure 9:
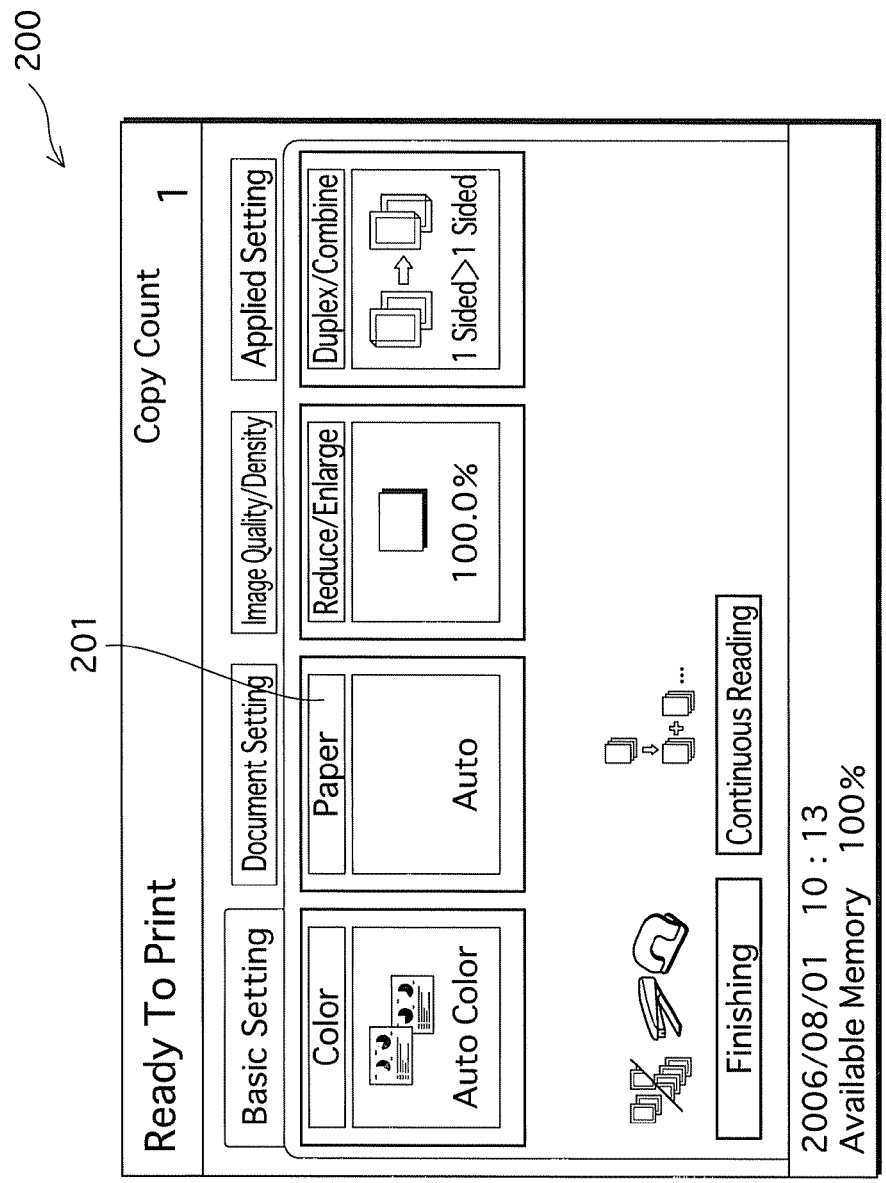
FIG. 9 is a view showing an example of a local user-interface image 200.
Figure 10:
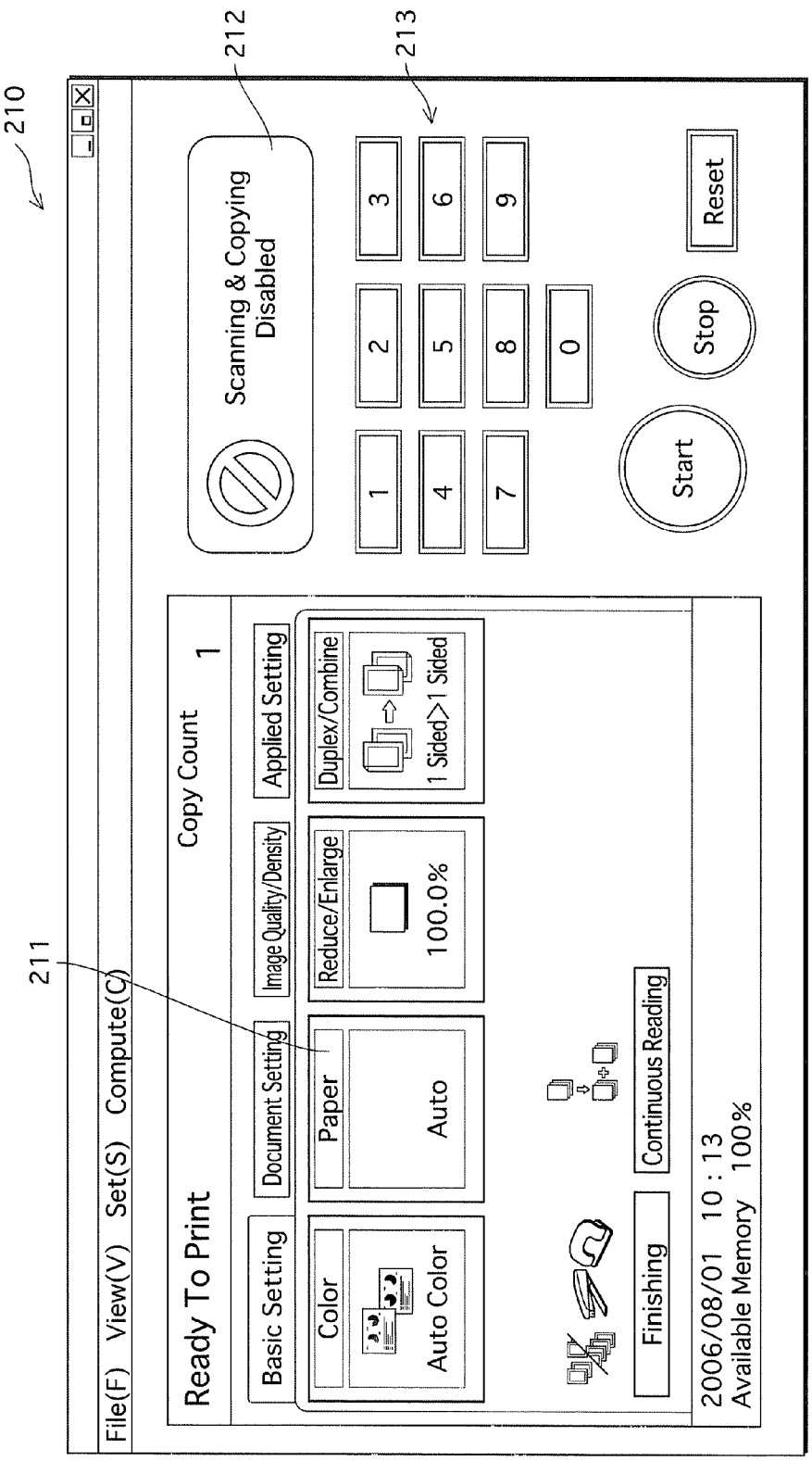
FIG. 10 is a view showing an example of a remote user-interface image 210.

If the newly created instance has the local instance (Step S107: YES), the image forming apparatus 100 creates a user-interface image to be displayed on the local operation panel (Step S108). On the other hand, if the newly created instance has the remote attribute (Step S107: NO), the image forming apparatus 100 creates a user-interface image to be displayed on the remote terminal (Step S109). FIG. 9 shown an exemplary local user-interface image 200 to be displayed on the local operation panel. FIG. 10 shows an exemplary remote user-interface image 210 to be displayed on the remote terminal. The remote user-interface image 210 includes a message 212 and software buttons 213. The message 212 indicates to the user that the scan and copy functions are disabled on the remote terminal. The software buttons 213 are provided correspondingly in function and appearance to hardware buttons provided on the operation panel 110. Each user-interface image may have a plurality of states, including a color setting interface image, a paper-size setting interface image, and a scaling setting interface image. The states of user-interface image are hierarchically organized and switched from one another in response to a user operation. In Steps S108 and, S109, the initial user-interface image is created, to be in the state having the highest hierarchical level. In addition, the image forming apparatus 100 stores information indicating the current state of the user-interface image into the instance corresponding to the user-interface image.

The image forming apparatus 100 transmits the created user-interface image along with the issued ID to the client having made the user-interface display request (Step S110).

The client stores the received ID and displays the received user-interface image. As a result, the user is allowed to operate the image forming apparatus by making input on the user-user-interface displayed on the client.

After executing Step S110, the image forming apparatus 100 is again placed in the standby mode (Step S101: NO). Being placed back into the standby mode, the image forming apparatus 100 creates an instance each time a user-interface display request is newly received from a client. In other words, the image forming apparatus 100 is capable of holding a plurality of instances at the same time (For example, the instances 152 and 153 shown in FIG. 1).

Figure 4:
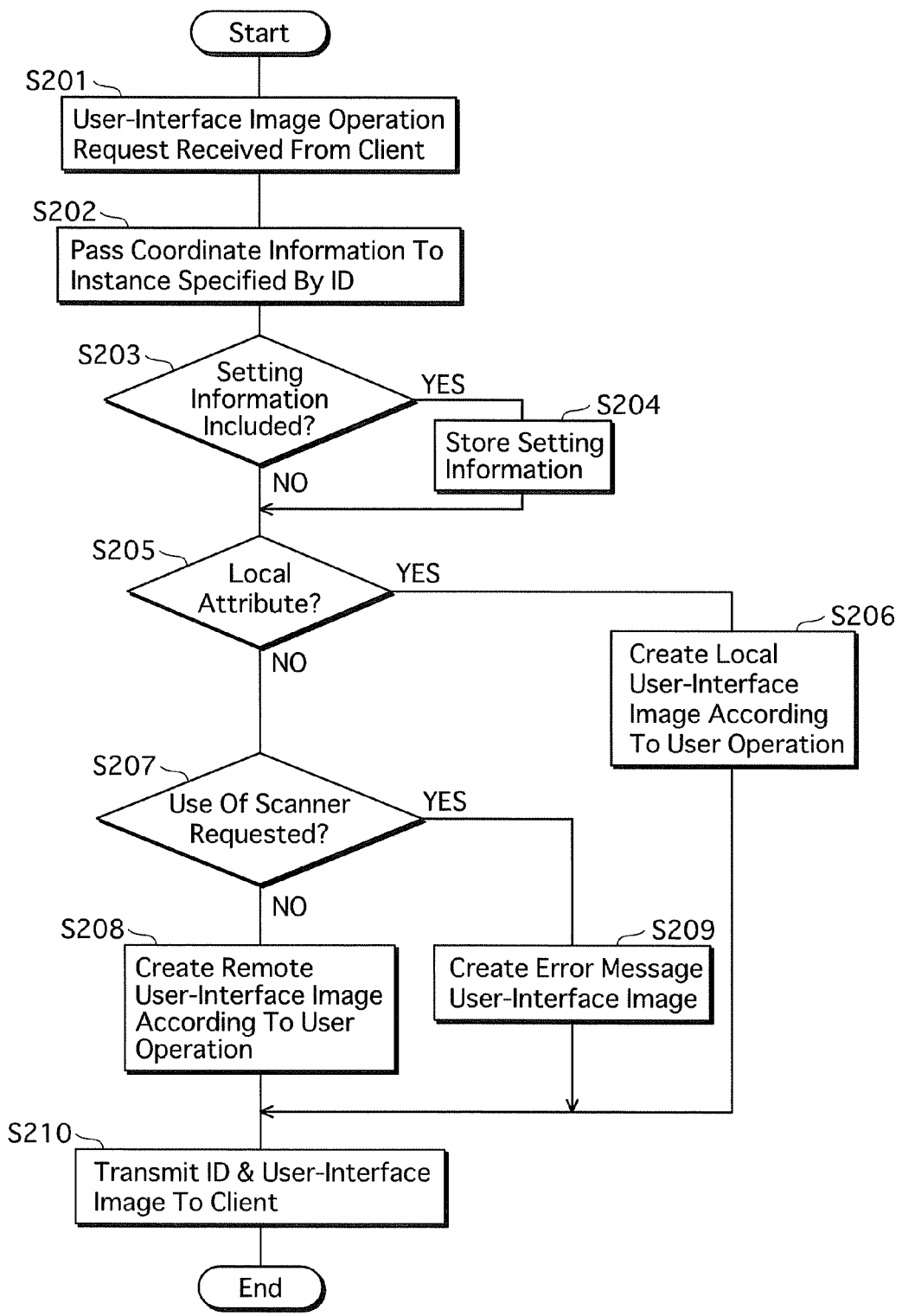
FIG. 4 is a flowchart of processing steps performed by the image forming apparatus 100, upon receipt of a user-interface operation request.

FIG. 4 is a flowchart of processing steps performed by the image forming apparatus 100, upon receipt of a user-interface operation request.

When a user operation is made on the user-user-interface image displayed on a client, the client issues a corresponding user-interface operation request to the image forming apparatus. The user-interface operation request includes the ID of the instance that is stored on the client and also includes coordinate information indicating a point specified, by the user, on the currently displayed user-interface image. FIG. 7 shows exemplary information included in a user-interface operation request. In this example, the ID "000001" and the coordinate information "100 and 252" are included.

Upon receipt of the user-interface operation request from the client (Step S201), the image forming apparatus 100 specifies, out of all the instances stored on the management table 154, an instance that corresponds to the ID included in the received user-interface operation request. The image forming apparatus 100 then passes the received coordinate information to the thus specified instance (Step S202). Since the specified instance stores therein the current state of the user-interface image, the image forming apparatus 100 can identify the user operation made on the client, based on the state of the user-interface image and the coordinate information.

If the thus identified user operation relates to setting for execution of a job (Step S203: YES), the image forming apparatus 100 stores the setting information into the instance (Step S204). FIG. 8 shows an example of the setting information stored in the instance. In this example, the job type is set to "COPY", the paper size is set to "A4", and the color is set to "full color".

Figure 11:
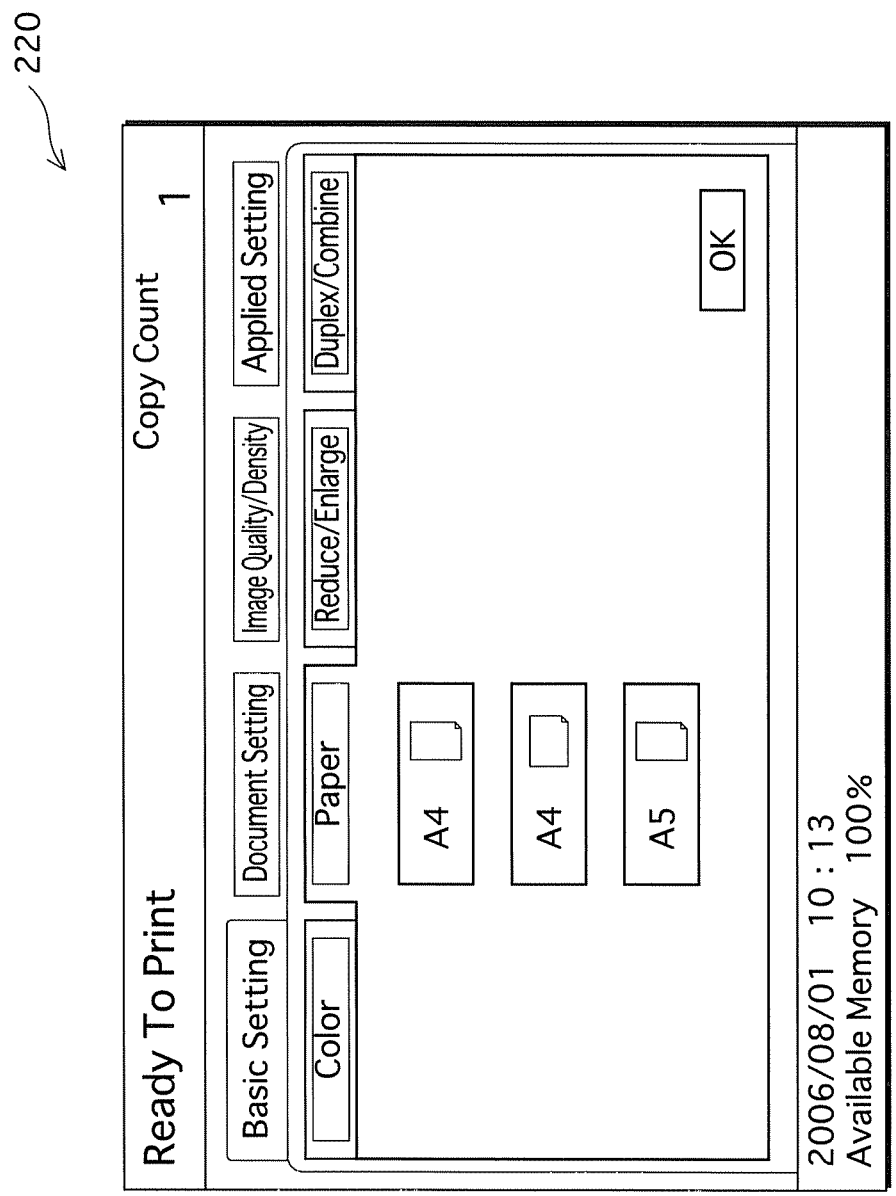
FIG. 11 is a view showing an example of a local user-interface image 220.
Figure 12:
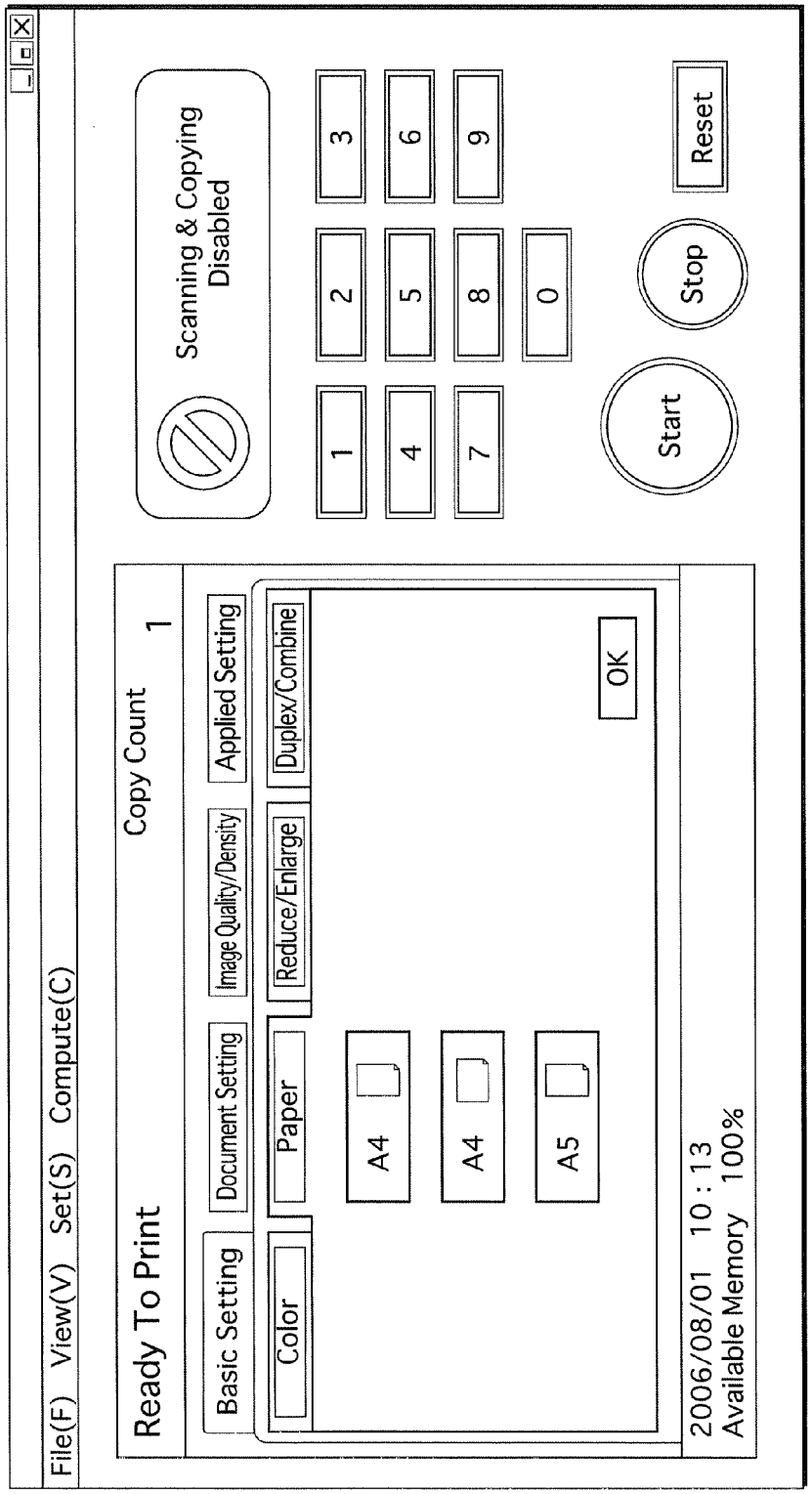
FIG. 12 is a view showing an example of a remote user-interface image 230.
Figure 13:
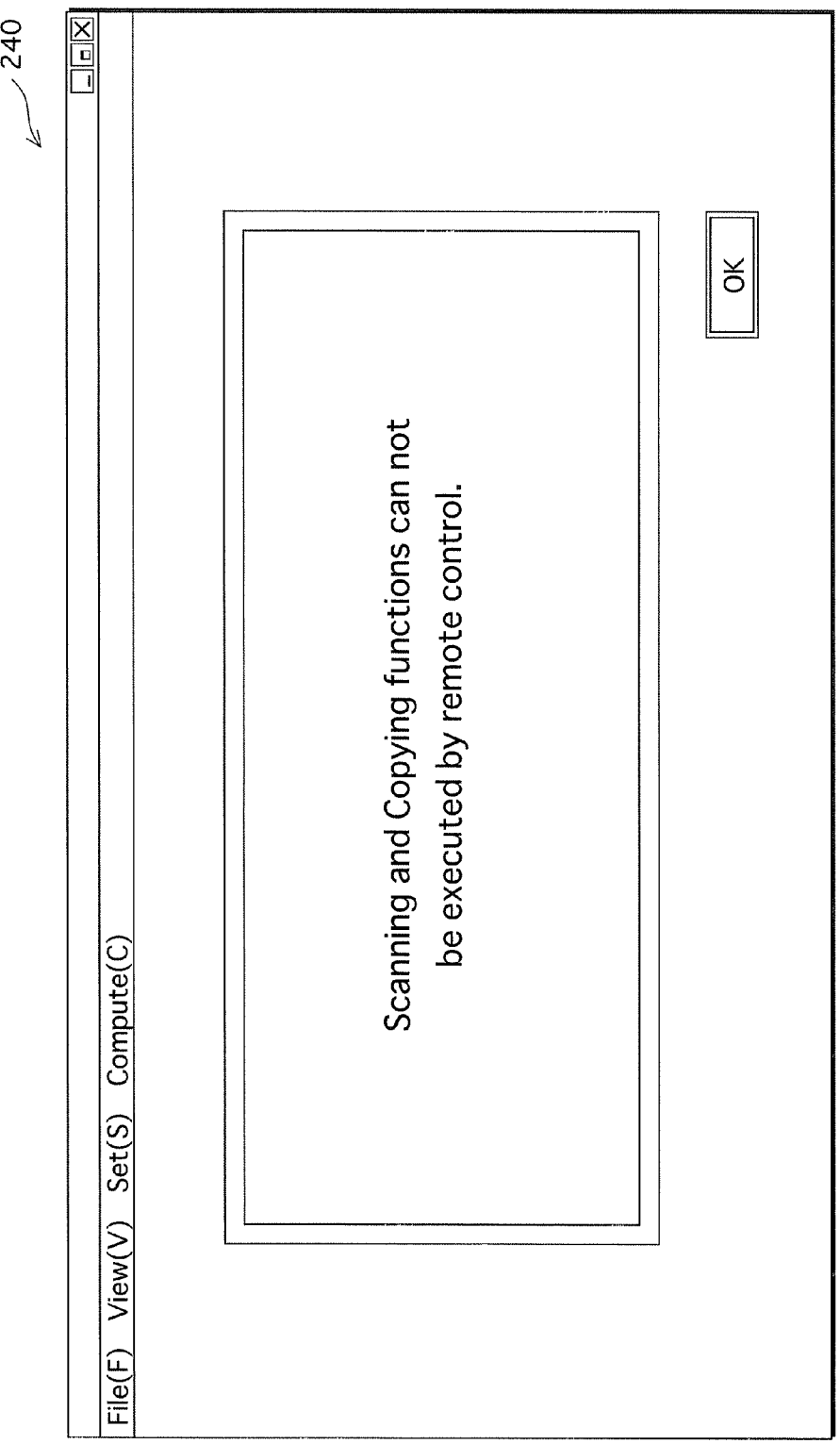
FIG. 13 is a view showing an example of an error message user-interface image 240.

If the instance specified by the ID has the local attribute (Step S205: YES), the image forming apparatus 100 creates a local user-interface image according to the user operation (Step S206). On the other hand, if the instance has the remote attribute (Step S205: NO) and if the user operation relates to a job to be executed without use of the scanner (Step S207: NO), the image forming apparatus 100 creates a remote user-interface image according to the user operation (Step S208). On the other hand, if the user operation relates to a job to be executed with use of the scanner (Step S207: YES), the image forming apparatus 100 creates an error message user-interface image (Step S209). FIGS. 11, 12, and 13 show examples of the local user-interface image 220, the remote user-interface image 230, and the error message user-interface image 240. In these examples, a region 201 is presented on the user-interface image 200 having the state shown in FIG. 9 and the region 201 is linked to the user-interface image 220 having the state shown in FIG. 11. In addition, a region 211 presented on the user-interface image 210 having the state shown in FIG. 10 is linked to the user-interface image 230 having the state shown in FIG. 12. The image forming apparatus 100 updates the information that indicates the current state of the user-interface image and that is stored in the instance with which the user-interface image is created.

The image forming apparatus 100 transmits the issued ID and the user-interface image to the client having issued the user-interface operation request (Step S210).

The client displays the newly received user-interface image and overwrites the stored ID with the newly received ID.

Figure 5:
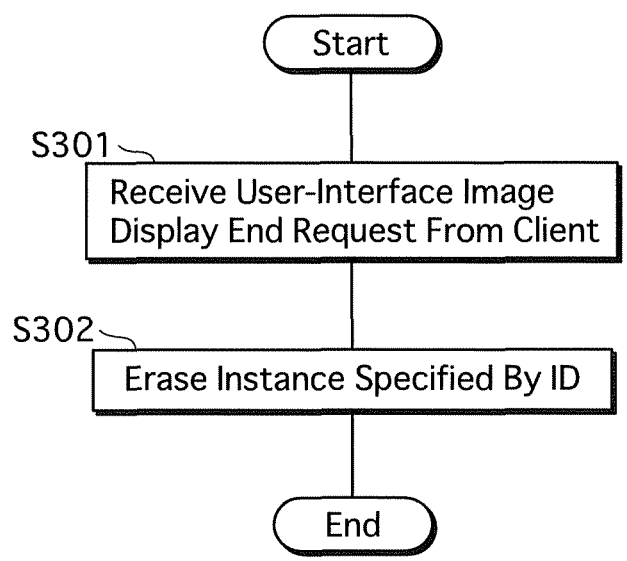
FIG. 5 is a flowchart of processing steps performed by the image forming apparatus 100, upon receipt of a user-interface display end request.

FIG. 5 is a flowchart of processing steps performed by the image forming apparatus 100, upon receipt of a user-interface display end request.

A client currently displaying a user-interface image issues a user-interface display end request to the image forming apparatus, in response to a predetermined event, such as switch-off or a user operation. The user-interface display end request includes the ID of an instance stored on the client.

Upon receipt of the user-interface display end request from the client (Step S301), the image forming apparatus 100 specifies, out of all the instances stored on the management table 154, an instance that corresponds to the ID included in the received user-interface display end request. The image forming apparatus 100 then erases the thus specified instance from the instance area 151 (Step S302).

As has been described above, the image forming apparatus 100 according to the embodiment enabled to display different user-interface images on the operation panel 110 and the PC 170 and to receive different user operations on the respective user-interface images. In addition, even, if confidential information is input on the user-user-interface displayed on the PC 170, the confidential information does not affect display of the user-interface image on the operation panel 110, which improves the security. In addition, the instance 152 corresponding to the operation panel 110 belong to the same class as the instance 153 corresponding to the PC 170. Thus, a source-code module used for creating a user-interface image to be displayed on the operation panel 110 is commonly used for creating a user-interface image to be displayed on the PC 170. The common use of the source-code modulation leads to reduction of developing cost. In addition, users are allowed to make user operation on the local operation panel 110 as well as on the PC 170 substantially in the same manner.

Note that the above embodiment relates to the system that includes one operation panel and one PC, but this is cited merely by way of example. The present invention is not limited to the specific embodiment described above.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus connectable to a remote terminal, the image forming apparatus comprising:
    a local operation panel;
    a storage unit that stores a class definition, wherein the class definition corresponds to setting items to be set in response to user operations;
    an assignor for assigning a local attribute to a first instance, created by using the class definition stored in the storage unit, upon receipt of an interface acquisition request from the local operation panel and assigning a remote attribute to a second instance, created by using the class definition stored in the storage unit, upon receipt of an interface acquisition request from a remote terminal, wherein the first and second instances are stored in the storage unit; and
    an image creator that creates a first user-interface image to be displayed on the local operation panel using the first instance upon receipt of the interface acquisition request from the local operation panel, and that creates a second user-interface image to be displayed on the remote terminal by using the second instance upon receipt of the interface acquisition request from the remote terminal;
    wherein each user-interface image has at least a first state and a second state, and a predetermined region of the user-interface image in the first state is linked to the second state, and
    if the received interface acquisition request includes coordinate information indicating a user-specified point on the user-interface image in the first state and if the user-specified point is located within the predetermined region, the image creator creates a corresponding one of the user-interface images in the second state as the user-interface image to be displayed.

2. The image forming apparatus according to claim 1, wherein
    the predetermined region is associated with setting information for a job, and
    the image creator registers the setting information for the job.

3. The image forming apparatus according to claim 1, further comprising:
    a scanner, wherein
    the image creator performs the creation, so that the second user-interface image includes a message indicating that use of the scanner is disabled and the first user-interface image does not include the message.

4. The image forming apparatus according to claim 1, wherein
    the local operation panel includes a hardware button, and
    the image creator performs the creation, so that the second user-interface image includes a software button corresponding to the hardware button and the user-interface image does not include the software button.

5. A user-interface image creating method comprising:
    an acquisition request receiving step of receiving a request for acquiring a user-interface image;
    storing a class definition, wherein the class definition corresponds to setting items to be set in response to user operations;
    assigning a local attribute to a first instance, created by using the stored class definition, upon receipt of an interface acquisition request from the local operation panel and assigning a remote attribute to a second instance, created by using the stored class definition, upon receipt of an interface acquisition request from a remote terminal, and storing the first and second instances; and
    an image creating step of creating, if the request is received from the local operation panel disposed on an image forming apparatus, a first user-interface image to be displayed on the local operation panel by using the first instance, and creating, if the request is received from the remote terminal that is connected to the image forming apparatus, a second user-interface image to be displayed on the remote terminal by using the second instance;
    wherein each user-interface image has at least a first state and a second state, and a predetermined region of the user-interface image in the first state is linked to the second state, and
    if the request includes coordinate information indicating a user-specified point on the user-interface image in the first state and if the user-specified point is located within the predetermined region, a corresponding one of the user-interface images in the second state is created in the image creating step as the user-interface image to be displayed.

6. The user-interface image creating method according to claim 5, wherein
    the predetermined region is associated with setting information for a job, and
    in the image creating step, the setting information for the job is registered.

7. A nontransitory computer-readable recording medium storing a program thereon, said program comprising code that causes a computer to perform:
    an acquisition request receiving step of receiving a request for acquiring a user-interface image;
    storing a class definition, wherein the class definition corresponds to setting items to be set in response to user operations;
    assigning a local attribute to a first instance, created by using the stored class definition, upon receipt of an interface acquisition request from the local operation panel and assigning a remote attribute to a second instance, created by using the stored class definition, upon receipt of an interface acquisition request from a remote terminal, and storing the first and second instances; and
    an image creating step of creating, if the request is received from the local operation panel disposed on an image forming apparatus, a first user-interface image to be displayed on the local operation panel by using the first instance, and creating, if the request is received from the remote terminal that is connected to the image forming apparatus, a second user-interface image to be displayed on the remote terminal by using the second instance;

wherein each user-interface image has at least a first state and a second state, and a predetermined region of the user-interface image in the first state is linked to the second state, and if the request includes coordinate information indicating a user-specified point on the user-interface image in the first state and if the user-specified point is located within the predetermined region, a corresponding one of the user-interface images in the second state is created in the image creating step as the user-interface image to be displayed.

8. The computer-readable recording medium according to claim 7, wherein the predetermined region is associated with setting information for a job, and in the image creating step, the setting information for the job is registered.

9. The image forming apparatus according to claim 1, wherein a source-code module used for creating the first user-interface image to be displayed on the local operation panel can be used for creating the second user-interface image to be displayed on the remote terminal.

\* \* \* \* \*